(No Model.)
S. H. PULLMAN.
CYCLE SEAT.
No. 563,063. Patented June 30, 1896.
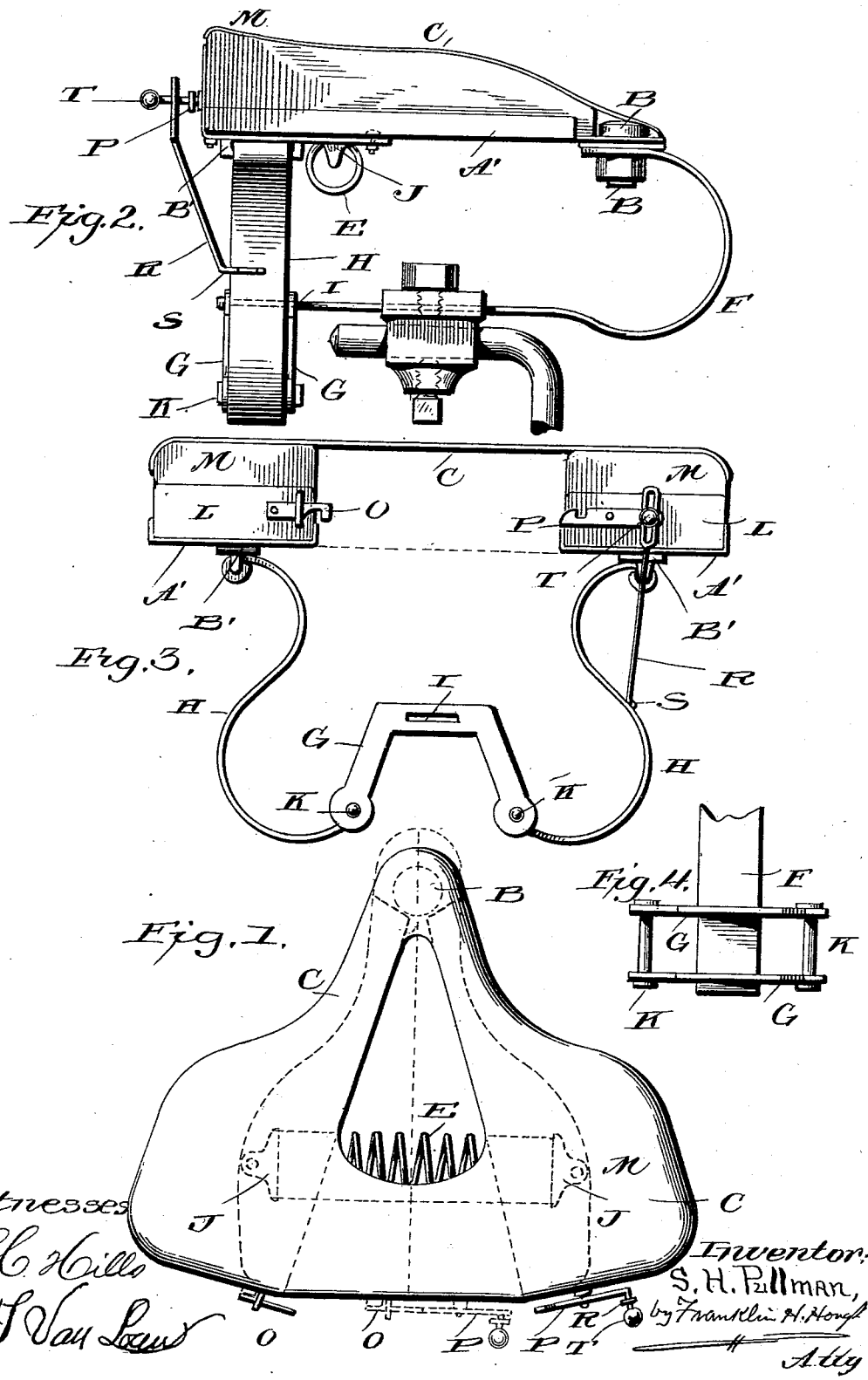
Witnesses
L. C. Hills
U. S. Van Loan
Inventor.
S. H. Pullman,
by Franklin H. Hough
Atty

UNITED STATES PATENT OFFICE.

SAMUEL HENRY PULLMAN, OF LAKE MAITLAND, FLORIDA, ASSIGNOR TO JOSEPH H. JONES, OF ORLANDO, FLORIDA.

CYCLE-SEAT.

SPECIFICATION forming part of Letters Patent No. 563,063, dated June 30, 1896.

Application filed October 4, 1895. Serial No. 564,621. (No model.)

*To all whom it may concern:*

Be it known that I, SAMUEL HENRY PULLMAN, a subject of the Queen of Great Britain, residing at Lake Maitland, in the county of Orange and State of Florida, have invented certain new and useful Improvements in Cycle-Seats; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in expanding cycle-saddles; and it consists in, first, a bicycle-saddle composed of two parts, which are pivoted together at their front ends and which expand or open outward toward their rear ones, combined with a spring for forcing the two parts of the saddle away from each other at their rear ends; second, a bicycle-saddle composed of two parts which are pivoted together at their front ends, combined with a longitudinal spring which supports the entire saddle, and two springs extending at right angles to the longitudinal spring, and which two springs support the rear end of the saddle, as will be more fully described hereinafter.

The objects of my invention are to provide an expanding saddle for bicycles, and which are intended more especially for ladies' use, so as to give them proper support while riding; to support the entire saddle by a spring which extends longitudinally therewith, and to support the rear ends upon two separate springs which allow the ends to freely open and close, and to provide the saddle with an automatically-releasing mechanism, and a spring for expanding the rear end of the saddle as the rider mounts thereon.

In the accompanying drawings, Figure 1 is a plan view of the saddle which embodies my invention, the parts being shown as expanded in solid lines and closed in dotted lines. Fig. 2 is a side elevation of the same. Fig. 3 is a rear view of the saddle, showing the two parts expanded. Fig. 4 is a detail view.

F represents the supporting-spring, which is secured to the frame of the bicycle by a suitable clamp, which allows the spring F to be adjusted back and forth therein, as may be desired. This spring supports the entire saddle, and has its front end curved upward and backward, so that the two parts M of the saddle can be secured thereto by means of the pivotal bolt B, upon which the two parts of the saddle freely move as they are being opened and closed.

Each portion of the saddle consists of sheet-metal plates or supports A', which are turned up at their edges, as shown in Figs. 2 and 3, and which are connected at their front ends by the pivotal bolt B. Between the turned-up edges of the sheet-metal parts A' are secured the blocks or pieces L, of any suitable material, upon the top of which the parts M are formed, and which pieces extend at their front ends within a short distance of the bolt B.

The pads M may be pneumatic, stuffed, or made in any manner desired, and a sheet of leather, rubber, cloth, or other material with which the pads are covered will be stretched across from one pad to the other, so as to form a cover C for the open space between the two pads when they are opened outward, and thus help to form a continuous seat the whole width of the saddle. This covering C extends forward beyond the pads and over the top of the bolt B, so as to form a cover for the entire saddle. When the parts of the saddle are opened outward, this cover C is stretched tightly, but when the saddle is closed, as shown by dotted lines in Fig. 1, the surplus material drops down between the two portions of the saddle out of the way.

The rear end of the saddle is supported by the two springs H, which are preferably curved, as shown in Fig. 3, and which have their upper ends secured to a suitable metallic framework B', secured to the saddle-frame, and their lower ends secured to the rods K, which connect the two slotted inverted-U-shaped plates G. The lower ends of the springs are bent around the rods K, and the upper ones are bent around their pivotal rods, and hence both parts of the saddle are free to move in being opened and closed. The two plates G are supported upon the rear end of the spring F, which passes through the slots I in the tops of the plates, as shown in Figs. 2 and 3. While the spring F extends longitudinally with the saddle, the two springs H extend at right angles thereto, and support the rear end of the saddle whether in an open or closed position.

Secured to the under side of each of the supports is a suitable metallic frame J, and secured between these two frames J is a coil or other suitably-shaped spring E, which throws the two parts of the saddle apart as soon as they are left free to move.

In order to hold the two parts of the saddle in the closed position shown by dotted lines in Fig. 1, the two parts are provided with the latch O P, which when the parts are pressed together automatically lock them in a closed position.

In order to make these two parts of the saddle automatically separate when the rider mounts thereon, the bent rod R has its lower end S secured to one of the springs H and its upper slotted end to project above the lower portion of one of the parts of the saddle. Through this slotted portion of the rod R extends the horizontal handle T, which is connected to the outer end of the pivoted portion P of the latch. When the rider mounts upon the saddle, his or her weight causes the saddle to descend, and when the handle T strikes against the bottom of the slotted portion of the rod, the outer end of the latch P is raised and the inner end depressed, so as to cause the two parts of the latch to separate, when the two portions of the saddle are instantly forced apart by the spring E without any attention whatever upon the part of the operator.

The two parts of the saddle are closed by hand, so as to allow the rider to mount more readily upon it, but as soon as he does mount it opens to its greatest extent as soon as the saddle is depressed by the weight of the rider.

What I claim to be new, and desire to secure by Letters Patent, is—

1. A saddle composed of two parts which are pivoted together at their front ends and adapted to open at their rear ones, combined with a spring for forcing the rear ends apart, substantially as described.

2. A saddle composed of two parts which are pivoted together at their front ends, and adapted to open at their rear ones, combined with a spring for forcing the rear ends apart when left free to move, and a latch or fastening device for holding the two parts of the saddle together when closed, substantially as set forth.

3. A bicycle-saddle composed of two parts which are pivoted together at their front ends, and adapted to open outward at their rear ones, combined with a longitudinal spring which supports the entire saddle, and two separate springs which support the rear ends, substantially as shown.

4. A bicycle-saddle composed of two parts which are pivoted together at their front ends and adapted to open at their rear ones, combined with a longitudinal flat spring to which the front end of the saddle is secured, and two flat bent springs which extend at right angles to the longitudinal one, and which support the rear end of the saddle, substantially as set forth.

5. A saddle composed of two parts pivoted together at their front ends, and adapted to open outward at their rear ones, combined with a longitudinal spring to which the front end of the saddle is secured, and two flat springs which are secured at their lower ends to the rear end of the longitudinal spring, and which have their upper ends secured to the rear ends of the two parts of the saddle, substantially as described.

6. A saddle composed of two parts which are pivoted together at their front ends and adapted to open out at their rear ones, combined with a longitudinal supporting-spring to which the front end of the saddle is secured, two plates secured to the spring, and two springs which extend at right angles to the longitudinal one and support the rear ends of the saddle, substantially as specified.

7. A two-part saddle, combined with a longitudinal spring to which the front end of the saddle is secured, and two supporting-springs secured to and rising from the rear end of the longitudinal spring, the two springs being placed at right angles to the longitudinal one and having both of their ends pivoted so that the two parts of the saddle are free to open and close, substantially as shown.

8. A saddle composed of two parts which are pivoted together at their front ends, and which are adapted to open at their rear ones, combined with a covering which extends over the entire top of the saddle, substantially as set forth.

9. A bicycle-saddle, composed of two parts which are pivoted together at their front ends and adapted to open outward at their rear ones, combined with a cover C, which closes over the space between the inner edges of the two portions of the saddle when they are opened out, substantially as specified.

10. A saddle composed of two parts which are adapted to open out at their rear ends and a spring for forcing the two portions apart when they are left free to move, combined with a longitudinal supporting-spring, a spring-support for the rear ends of the two parts of the saddle, and which support is mounted upon the rear end of the longitudinal spring, a latch for holding the two parts of the saddle together when closed, and a releasing mechanism connected to the latch and operated by the spring-support, substantially as shown.

11. A saddle composed of two parts which are adapted to be opened and closed at their rear ends, a latch for holding the two parts together when closed, a handle connected to one of the parts of the latch, a slotted rod through the upper end of which the handle extends, and a spring-support to which the lower end of the slotted rod is secured, whereby when the saddle sinks from the weight of the rider the latch will be operated, substantially as specified.

In testimony whereof I affix my signature in presence of two witnesses.

SAMUEL HENRY PULLMAN.

Witnesses:
W. W. TOWNSEND,
B. A. GALLOWAY.